United States Patent [19]
Pratt

[11] Patent Number: 5,637,971
[45] Date of Patent: Jun. 10, 1997

[54] SUPPRESSION OF MULTIPLE NOISE-RELATED SIGNALS IN PULSE WIDTH MODULATED SIGNALS

[75] Inventor: Gill A. Pratt, Lexington, Mass.

[73] Assignee: Solectria Corporation, Wilmington, Mass.

[21] Appl. No.: 489,550

[22] Filed: Jun. 12, 1995

[51] Int. Cl.$^6$ .................................................. G05B 11/28
[52] U.S. Cl. ........................ 328/599; 318/138; 318/254; 318/439; 318/280
[58] Field of Search ............................. 318/138, 254, 318/439, 599, 600, 798–815, 280; 364/574; 326/31

[56] References Cited

U.S. PATENT DOCUMENTS

| | | | |
|---|---|---|---|
| 4,757,241 | 7/1988 | Young | 318/254 |
| 4,849,871 | 7/1989 | Wallingford | 363/41 |
| 4,977,492 | 12/1990 | Kirchberg, Jr. et al. | 363/41 |
| 4,987,361 | 1/1991 | Ohms | 323/222 |
| 5,005,136 | 4/1991 | Van Berkel et al. | 364/574 X |
| 5,079,498 | 1/1992 | Cleasby et al. | 323/283 |
| 5,117,314 | 5/1992 | Bathaee et al. | 318/254 X |
| 5,192,922 | 3/1993 | Jordan | 332/109 |
| 5,287,051 | 2/1994 | Konrad et al. | 318/803 |
| 5,379,209 | 1/1995 | Goff | 363/132 |
| 5,379,321 | 1/1995 | Girmay | 375/22 |
| 5,412,293 | 5/1995 | Minezawa et al. | 318/376 |
| 5,450,020 | 9/1995 | Jones et al. | 326/31 |

OTHER PUBLICATIONS

"A Theory of Asynchronous Circuit" by Muller et al; Proceedings Proceedings of an International Symposium on the Theory of Switching, vol. 29 of the Annals of the Computation Laboratory of Harvard University; Harvard University Press 1959.

Primary Examiner—Karen Masih
Attorney, Agent, or Firm—Hayes, Soloway, Hennessey, Grossman & Hage, P.C.

[57] ABSTRACT

A system for generating pulse width modulated signals is provided. The signals are generated in response to control and reference signals that are subject to noise-related interference. Signals erroneously generated as a result of the interference are suppressed from the final signals output by the system without reducing the duty cycle of the final output signals.

41 Claims, 10 Drawing Sheets

SUPPRESSION OF MULTIPLE NOISE-RELATED SIGNALS IN PULSE WIDTH MODULATED SIGNALS

BACKGROUND OF THE INVENTION

1. Field of the Invention

The present invention is generally related to pulse width modulator systems, and more specifically, to a pulse width modulation system having improved means for suppressing erroneously-generated, noise-related pulses from the final pulse width modulated signal output by the modulator. Particular utility for the present invention is found in the area of electric motor drive switching control, and the present invention will be described in connection with this utility, although other utilities for the present invention are also contemplated, including other power supply and generation control applications.

2. Brief Description of Related Prior Art

Figure 1:
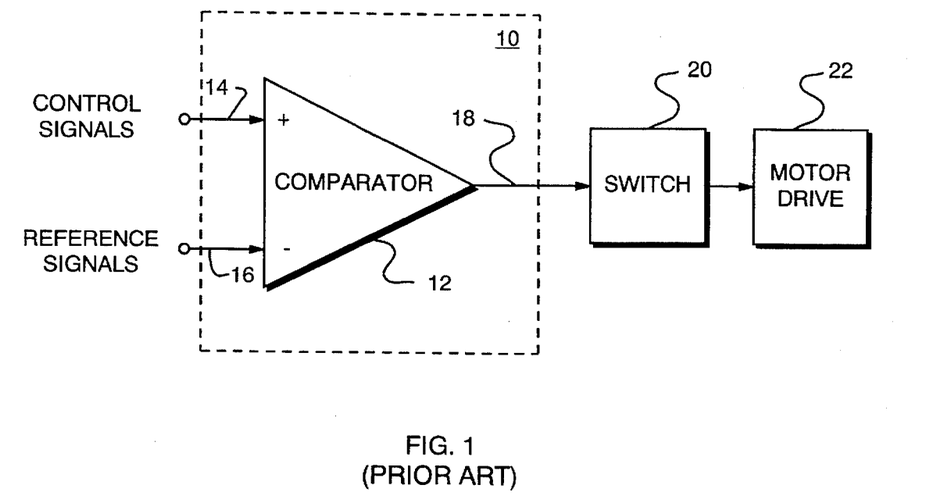
FIG. 1 is a schematic diagram of a prior art pulse width modulator system.

Pulse width modulators are widely known and used in the art to control switching of motor drives. As shown in FIG. 1, a typical pulse width modulator 10 consists essentially of a comparator 12 which compares the magnitude of a time-varying control signal at one input 14 with that of a periodic excitation or reference signal at a second input 16, and generates at output 18 an output pulse, whose duty cycle is a function of the comparison, for controlling the state of a switch 20 for actuating a motor drive 22. Typically, the reference signal has a triangular waveform, since this makes the output signal duty cycle vary roughly linearly with the magnitude of the control signal amplitude. Also typically, the comparator 12 is adapted to produce an output pulse (i.e., high logic state) when the amplitude of the reference signal exceeds that of the control signal, although depending upon the logic of the switch, comparator, and/or the nature of the control and reference signals, the comparator may be adapted to generate output pulses when the opposite is true (i.e., to go into a high logic state when the amplitude of the control signals exceed that of the reference signals).

Unfortunately, the motor, wiring, power electronics, and electromechanical circuitry typically used in motor drive systems generate considerable electrical noise, which noise is often unintentionally (and unpredictably) injected into the control and/or reference signals of the pulse width modulator controlling the motor drive (e.g., due to close proximity of the pulse width modulator to the noise-producing circuits and devices, faulty system grounding, and/or inadequate shielding of the pulse width modulator from the noise-producing circuits and devices). Such injected noise can have deleterious effects on the performance of the motor drive system. For example, when the magnitudes of the control and reference signals are approximately equal, but not yet within the desired threshold for toggling of the comparator's output, injected noise into one or both of the control and reference signals can distort the actual difference between the control and reference signals. Given the chaotic and unpredictable nature of such injected noise, this can cause the comparator to unpredictably generate erroneous switching commands (i.e., commands to toggle switching of the motor drive when no such toggling is desired). This can cause the motor drive to repeatedly switch on and off in cycles of unpredictable duration. This can greatly decrease the efficiency of the motor drive, and in extreme cases, can damage the motor drive or switch.

Figure 2:
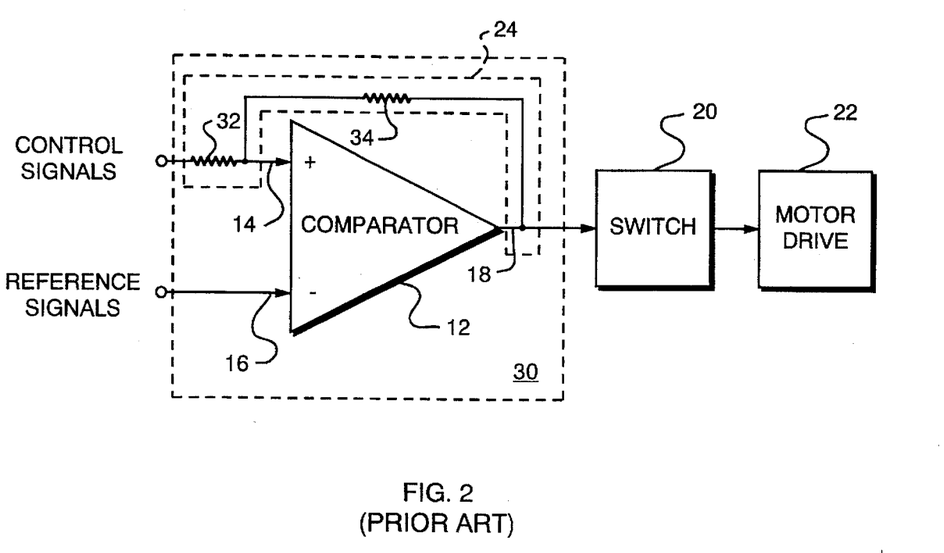
FIG. 2 is a schematic diagram of another prior art pulse width modulator system.

Several conventional techniques exist to suppress generation of noise-related output pulses in pulse width modulator systems. One such conventional technique is shown in FIG. 2 and uses a resistor-based positive feedback system 24 to generate a noise-suppressing hysteresis in the modulator 30. By selecting appropriate values for the resistors 32, 34 of the loop 24, the hysteresis of the system 24 can be made larger than the largest expected amplitude of injected noise, thereby substantially negating the effects of injected noise on the system 30.

Unfortunately, however, this technique has several drawbacks. For example, in addition to suppressing the effects of injected noise of the system 30, the hysteresis generated by feedback loop 24 also has the effect of reducing the usable amplitude range of input control signals. Since, as stated above, the duty cycle of the output pulses usually varies substantially linearly with the amplitude of the control signals, this reduction of the usable amplitude range of the control signals results in a corresponding reduction in the duty cycle range of the output pulses. Disadvantageously, since the duty cycle of the output pulses effectively controls the speed of the motor drive, this phenomenon can result in a loss of controllable motor speed range roughly proportional to the reduction of the duty cycle range.

A further disadvantage of this technique results from the fact that the degree of noise suppression generated by feedback loop 24 is directly related to the values of the feedback resistors 32, 34, which must be fixed at the time of construction of the pulse width modulator system 30. Thus, in order for the system 30 to function properly, the maximum noise amplitude expected to be generated by the motor drive system must be very accurately predicted, and the values of resistors 32, 34 chosen accordingly. Unfortunately, however, it is often difficult (if not impossible) to make such predictions with the required accuracy.

Figure 3:
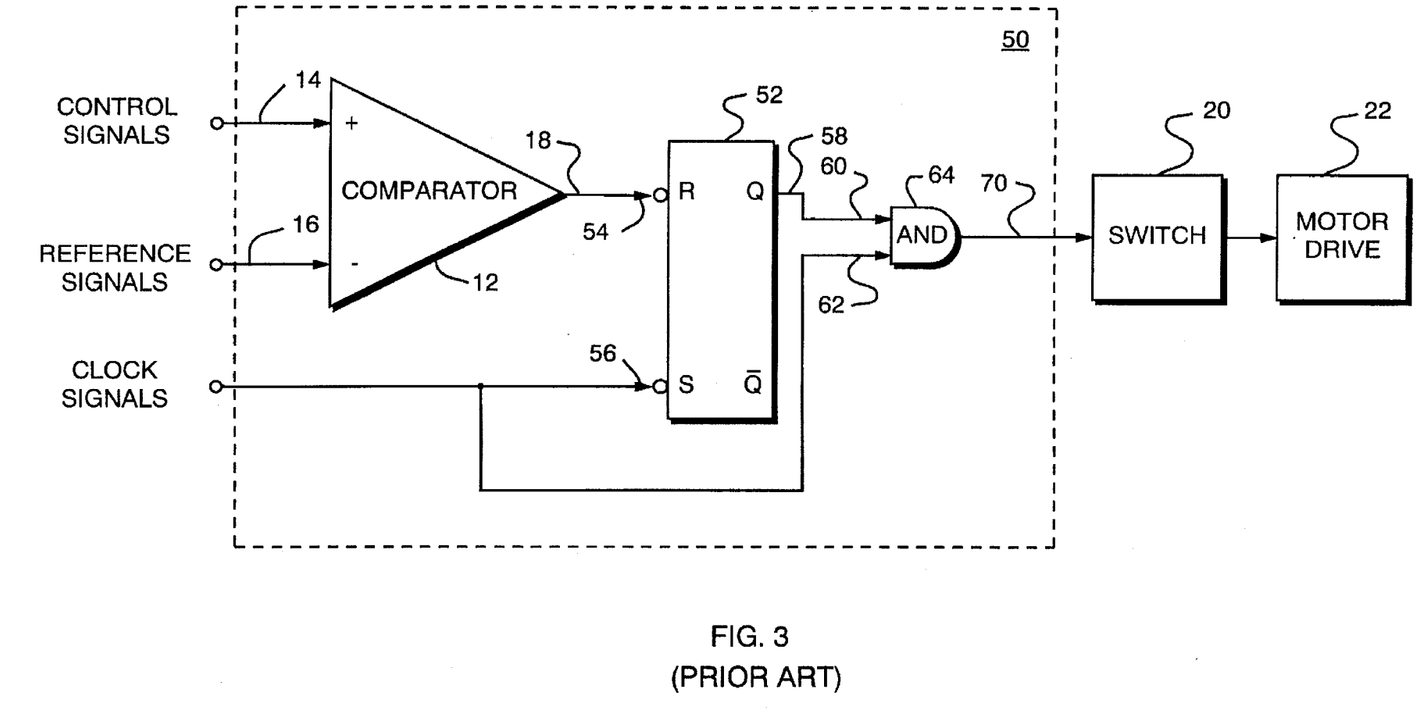
FIG. 3 is a schematic diagram of yet another prior art pulse width modulator system.

Another prior art pulse width modulator system 50 with noise related signal suppression is illustrated in FIG. 3. In system 50, the control signals and saw-tooth reference signals are input to the comparator. An unclocked set-reset flip-flop 52 receives the output signals of the comparator via inverting reset line 54, and a clock signal (of period equal to that of a saw-tooth reference signal) via inverting set line 56. The output 58 of the flip-flop 52 and the clock signal are connected to the inputs 60, 62 of a two-input AND gate 64. The output signals propagating on output 70 of the AND gate are used to control the motor drive.

In operation, the flip-flop 52 sets to a high output state only when the clock signal is low and the comparator output is high, and resets to a low output state only when the clock signal is high and the comparator output is low. The comparator's output signals have no effect on the flip-flop at all other times. The output of the flip-flop is clocked using AND gate 64. In this way, erroneously generated transitions in the comparator's output state have little chance of affecting the output state of the flip-flop. Thus, circuit 50 suppresses noise-related switching signals from the final output signals transmitted to the motor drive via output 70.

Unfortunately, however, flip-flop 52 requires a finite amount of time to set and reset itself. This means that the reference and clock signals must include a "dead time" (during which the flip-flop may be set or reset) which must be made greater than or equal to the minimum switching time of the flip-flop. Given typical flip-flop switching times and modern motor drive switching speeds, it is not uncommon for the minimum required "dead time" to be at least several percent of the switching time. Disadvantageously, this reduces the maximum available duty cycle of the output pulses for controlling the motor drive by an amount equal to the dead time, which in turn, reduces the controllable speed range of the motor.

Prior art pulse width modulator systems are disclosed in e.g., U.S. Pat. No. 4,757,241 to Young, U.S. Pat. No. 4,987,361 to Ohms, U.S. Pat. No. 4,977,492 to Kirchberg, Jr. et al., U.S. Pat. No. 4,849,871 to Wallingford, U.S. Pat. No. 5,079,498 to Cleasby et al., U.S. Pat. No. 5,192,922 to Jordan, U.S. Pat. No. 5,287,051 to Konrad et al., U.S. Pat. No. 5,379,209 to Goff, and U.S. Pat. No. 5,379,321 to Girmay. The systems disclosed in these patent suffer from the aforesaid and/or other disadvantages and drawbacks of the prior art.

OBJECTS OF THE INVENTION

It is therefore a general object of the present invention to provide a pulse width modulator system that overcomes the aforesaid and other disadvantages and drawbacks of the prior art, and more specifically, to provide such a system comprising improved means for suppressing erroneously-generated, multiple noise-related switching pulses from the final signal output by the modulator without reducing the duty cycle of the final signals and/or having to accurately predict expected noise amplitude.

SUMMARY OF THE INVENTION

In accordance with the present invention, a pulse width modulator system is disclosed having improved means for suppressing erroneously-generated, noise related pulses from the final pulse width modulated signal output by the modulator without reducing the duty cycle of the final signals. One embodiment of the system of the present invention is for generating pulse width modulated signals in response to control and reference signals. The reference signals have a time-varying waveform substantially without a dead time. In this embodiment, the improvement essentially comprises non-hysteretic means for suppressing noise-related pulses from the modulated signals whereby to generate pulse width modulated signal substantially free of erroneously generated, noise-related pulses.

Preferably, in this embodiment of the present invention, the means for suppressing the noise-related pulses from the modulated signals essentially comprises a Muller C-element, or rendez-vous circuit. The Muller C-element circuit preferably includes first, second, and third logical AND means. Each of the logical AND means has an output and two inputs. The Muller C-element also preferably includes a logical OR means having three inputs and an output. The output of the OR means transmits the final pulse width modulated signals in which final signals erroneously generated, noise-related pulses have been removed. The outputs of the AND means are connected to the inputs of the OR means. One of the inputs of the first AND means and one of the inputs of the third AND means are connected to the output of the OR means, while the other of the inputs of the first AND means and one of the inputs of the second AND means are for receiving pulse width modulated signals subject to inclusion of the noise-related pulses. The other of the inputs of the third AND means and the other of the inputs of the second AND means are for receiving timing signals. Additional details of the Muller C-element circuit are found in Muller, D. E. and Bartky, W. S. "A Theory of Asynchronous Circuits", Proceedings of an International Symposium on the Theory of Switching, Vol. 29 of the Annals of the Computation Laboratory of Harvard University. Harvard University Press, 1959.

Advantageously, the pulse width modulator system of the present invention is able to substantially suppress erroneously generated, noise-related pulses from the final pulse width modulated signals output by the system, without reducing the duty cycle of these final signals. Advantageously, this permits the system of the present invention to be able to suppress such erroneously generated signals without causing the controllable motor speed range to be reduced as in the prior art. Further advantageously, the suppressing means of the present invention is inherently insensitive to metastable states, since any metastable states generated by the suppressing means are rapidly extinguished.

These and other features and advantages of the present invention will become apparent as the following Detailed Description proceeds and upon reference to the Drawings, wherein like numerals depict like parts, and in which:

Although the following Detailed Description will proceed with reference being made to specific embodiments of the present invention, it should be understood that the present invention is not intended to be limited to these embodiments. Rather, many alternatives, modifications, and variations thereof will be apparent to those skilled in the art. Accordingly, the present invention should be viewed broadly, as being limited only as set forth in the hereinafter appended claims.

DETAILED DESCRIPTION OF PREFERRED EMBODIMENTS

Figure 4:
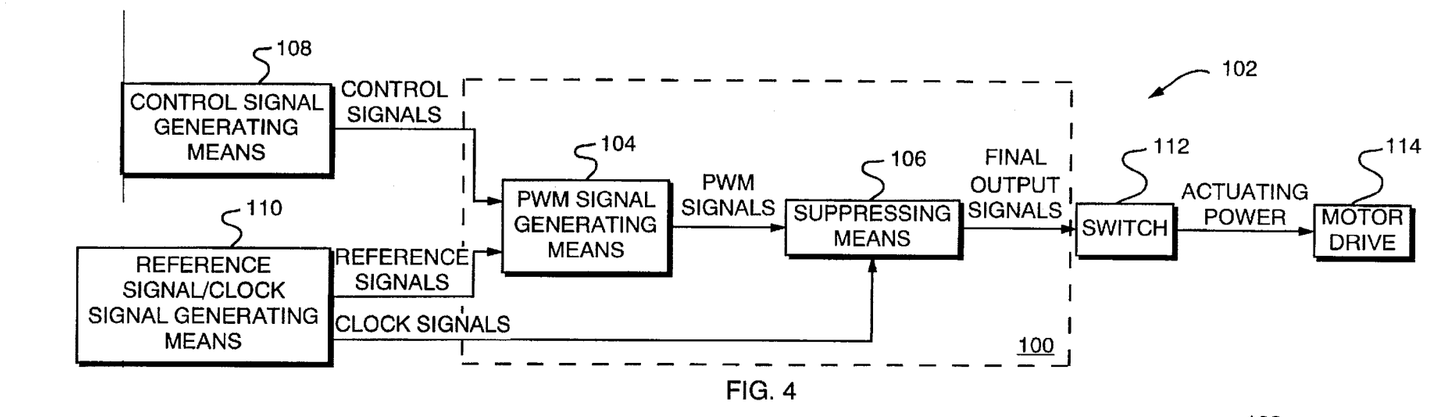
FIG. 4 is a functional block diagram of one preferred embodiment of the present invention shown in conjunction with other functional components of a motor drive system.
Figure 5:
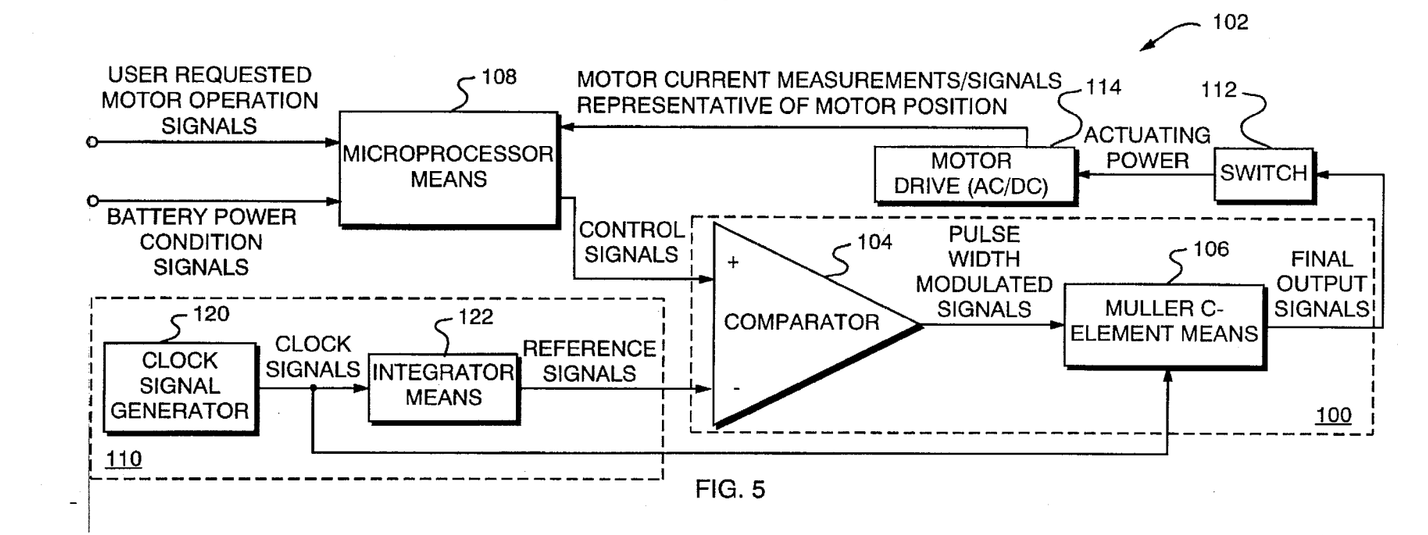
FIG. 5 is a more detailed schematic diagram of the drive system shown in FIG. 4.

Referring to FIGS. 4–5, one preferred embodiment 100 of the pulse width modulator system of the present invention is shown. Although the system 100 will be described in connection with a motor drive system 102, it should be understood that system 100 is not intended to be limited to being used in motor drive system 102. Rather, the following discussion is merely illustrative of one preferred use of the system 100 of the present invention.

Motor drive system 102 includes pulse width modulator control system 100, which system 100 generates, in response to control signals generated by generating means 108 and clock and reference signals generated by means 110, final output pulse width modulated signals for controlling actuation of AC or DC motor drive 114 by energizing controllable switch means 112. Pulse width modulator system 100 comprises a pulse width modulator signal generating means 104 and means 106 for suppressing noise-related, erroneously generated switching pulses from the final output signals transmitted to the switch 112.

Advantageously, for reasons that will be described more fully below, suppressing means 106 eliminates such erroneously generated switching pulses from the output signals sent to the switch 112 without reducing the duty cycle of the pulse width modulated signals generated by the PWM means 104. Advantageously, this permits the system 100 of the present invention to be able to suppress such erroneously switching pulses without reducing the controllable speed range of the motor 114, as in the prior art.

FIG. 5 is more detailed schematic of the construction of the system 102 of FIG. 4. As shown in FIG. 4, the control signal generating means 108 preferably comprises a conventional microprocessor and other associated memory and control circuitry (not shown). Microprocessor 108 is programmed to generate appropriate control signals for transmission to comparator 104 of system 100, based upon signals transmitted to the microprocessor 108 representative of desired and/or actual operation states of the motor 114. Such states may include user requested motor operation (i.e., user requested motor output speed and/or power), power supply and/or battery power storage condition, motor rotor position, etc. The microprocessor uses these states to generate control signals whose amplitude and duration are related to the actuation time of switch 112 necessary to achieve desired output of the motor 114.

Triangular reference signals are generated by reference signal generator 110. Preferably, generator means 110 comprises a conventional square wave clock signal generator 120 and an integrator means 122. In order to generate reference triangular wave signals, in generator means 110, square wave clock signals generated by means 120 are transmitted to integrator means 122 which converts the square waves into triangular reference signals without dead times via integration of the square waves. For reasons that will become apparent below, preferably, the square wave and triangular wave are synchronized such that the square wave has a low logic level during the time when the triangle wave has a positive slope, and the square wave has a high logic level during the time when the slope of the triangular wave is negative. In other words, preferably, the square wave has a low logic level during the time when the triangular wave is rising from its minimum amplitude to its maximum amplitude, and the square wave has a high logic level when the triangular wave is falling from its maximum amplitude to its minimum amplitude. Additionally, preferably, the maximum and minimum amplitudes of the control and reference signals are the same, and the period of the reference signals is less than the sample period of the control signals, whereby to ensure that the amplitude of the control signals changes at most once during each period of the reference wave.

The control signals generated by the microprocessor 108 and the reference signals generated by the signal generator 110 are transmitted to the pulse width modulator means 100. As shown in FIG. 5, the modulator means 100 preferably comprises a conventional comparator means 104, which means 104 generates pulse width modulated signals from the control and reference signals in a substantially similar manner to that discussed previously in connection with the comparator 14 of FIG. 1.

For the reasons discussed previously in connection with the device of FIG. 1, the pulse width modulated signals generated by comparator 104 are subject to inclusion of erroneously generated, noise-related pulses. In accordance with this embodiment of the present invention, these noise-related pulses are suppressed from the final output pulses used to control switch 112 by a conventional sequential Muller C-element or rendez-vous circuit 106 timed by the same clock signals generated by the clock signal generator means 120 used to generate the reference signals. Thus, the clock signals used as timing signals for the Muller C-element means 106 have the same period as those of the reference signals output by the reference signal generator 110. Advantageously, for reasons that will be discussed in connection with FIG. 6, Muller C-element means 106 suppresses the noise-related pulses from the pulse width modulated signals generated by the comparator 104 without reducing the duty cycle of these pulse width modulated signals.

Muller C-element means 106 generates the final output control pulses used to control motor switch 112 by suppressing erroneously generated, multiple noise-related pulses from the pulse width modulated signals generated by the comparator 104. The final output pulse width modulated signals generated by the Muller C-element means 106 control switch means 112 to provide actuating power to motor drive means 114.

Figure 6:
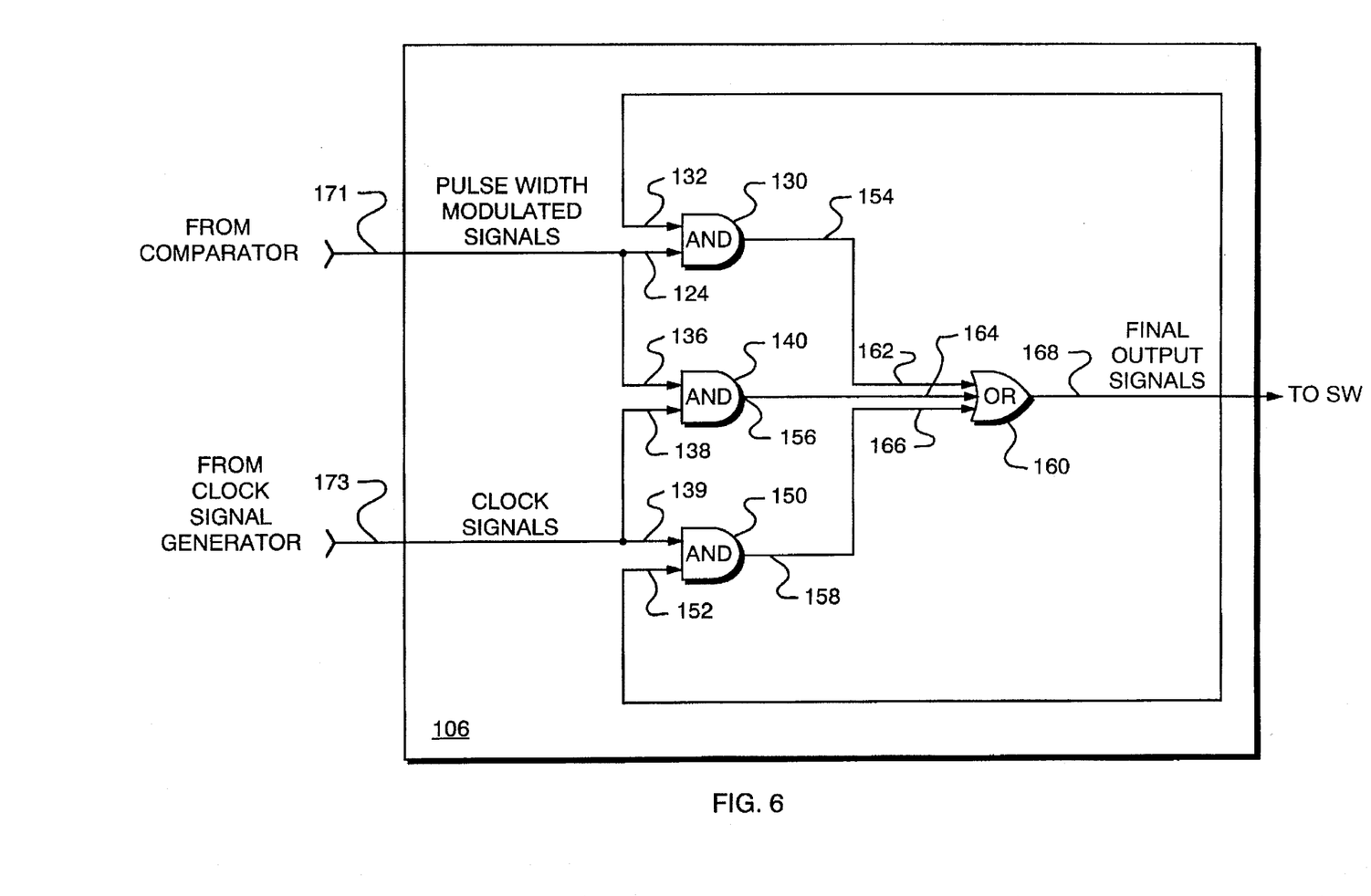
FIG. 6 is a detailed schematic diagram illustrating a preferred construction of the Muller C-element means of FIG. 5.

Turning now to FIG. 6, the preferred construction of the Muller C-element means 106 will now be described. It will be appreciated that the combinatorial logic configuration described below is merely illustrative, and variations thereof are possible so long as the overall function of element 106 and other design constraints necessary to achieve the aforesaid advantages of the present invention are satisfied.

Preferably, Muller C-element 106 comprises three conventional two-input AND gates 130, 140, 150 and one three-input OR gate 160. The outputs 154, 156, 158 of the AND means 130, 140, 150 are respectively connected to the three inputs 162, 164, 166 of the OR means 160. One 132 of the inputs of the first AND means 130 and one 152 of the inputs of the third AND means 150 are connected to the output 168 of the OR means 160, while the other 134 of the inputs of the first AND means 130 and one 136 of the inputs of the second AND means 140 are connected to the output of the comparator 104 for the receiving pulse width modulated signals subject to inclusion of the noise-related pulses generated by the comparator 104. The other 139 of the inputs of the third AND means 150 and the other 138 of the inputs of the second AND means 140 are connected to the clock signal generator 120 for receiving timing signals from the clock signal generator 120.

In operation of the Muller C-element 106, when both inputs 171, 173 of the circuit 106 have a high logic level, both inputs 136, 138 of the second AND means 140 also have a high logic level. This causes the output 156 of the second AND means 140 to go to a high logic level which is conducted to input 164 of the OR means 160. This forces the output 168 of OR means 160 to a high logic state, regardless of the logic states of any of the other inputs and outputs in the circuit 106.

Similarly, when both inputs 171, 173 have a low logic level, this forces the outputs 154, 156, 158 of all three AND gates 130, 140, 150 to a low logic state. This forces the output 168 of the OR gate 160 to a low logic state.

However, when the logic states of the two inputs 171, 173 disagree (i.e., one is high and the other is low), the output 168 of the circuit 106 will remain at its current logic level. This phenomenon results from the fact that when the two inputs 171, 173 of the circuit have different logic states, this forces the output 156 of second AND 140 to a low logic state, and causes one of the two 154, 158 outputs of the first 130 and third 150 AND gates to a logic level that agrees with the current level of output 168 of OR gate 160, while the other of the two 154, 158 outputs to a low logic state. Thus, since the outputs of the AND gates are connected to the inputs of the OR gate, the output 168 of OR gate 160 is forced to remain in its current logic state.

In operation of system 102, microprocessor means 108 generates control signals in the manner discussed previously. Likewise, reference signal/clock signal generator means 110 generates synchronous square and triangular waves. The triangular waves are compared to the control signals generated by the microprocessor in the comparator means 104. During the time when the triangular reference wave has a positive slope (i.e., prior to reaching its maximum amplitude), the comparator generates an output signal having a high logic level, unless the magnitude of the triangle wave exceeds that of the control signals, at which time the value of the comparator's output signal changes to low logic level. However, as stated above, during the time when the triangular reference wave has a rising slope, the clock signal has a low logic level. Thus, until the comparator's output changes from high to low logic level, the two inputs 171, 173 of the Muller C-element will disagree in logic level, thereby causing the Muller C-element's output 168 to remain in whatever logic state it was in previously.

If the logic level of the comparator's output changes from high to low while the triangular wave still a positive slope, the output 168 of the Muller C-element 106 will change to a low logic level, since both inputs 171, 173 will have a low logic level. Any subsequent changes in the logic level of the comparator's output while the triangular wave has a positive slope will not result in change of the level of the output 168 of the circuit 106 since the levels of the two inputs 171, 173 will once again disagree.

If the logic level of the comparator's output changes from low to high while the triangular wave has a negative slope, the output of 168 of the Muller C-element 106 will change to a high logic state, since both inputs 171, 173 of the element 106 will have a high logic level. Any subsequent changes in the logic level of the comparator's output while the triangular wave has a negative slope will not result in change of the logic level of output 168 since the levels of the two inputs 171, 173 will once again disagree.

Thus, the suppression means 106 of the system 100 of thee present invention ensures that output 168 of the modulator means 100 changes logic state only one time when the slope of the triangular wave is positive and only one time when the slope of the triangular wave is negative. Thus, the system 100 of the present invention suppresses multiple, noise-related pulses from the final output pulse width modulated signals transmitted by the system 100. Advantageously, this is accomplished in the system 100 of the present invention without reduction in the duty cycle of the output signals.

Figure 7A:
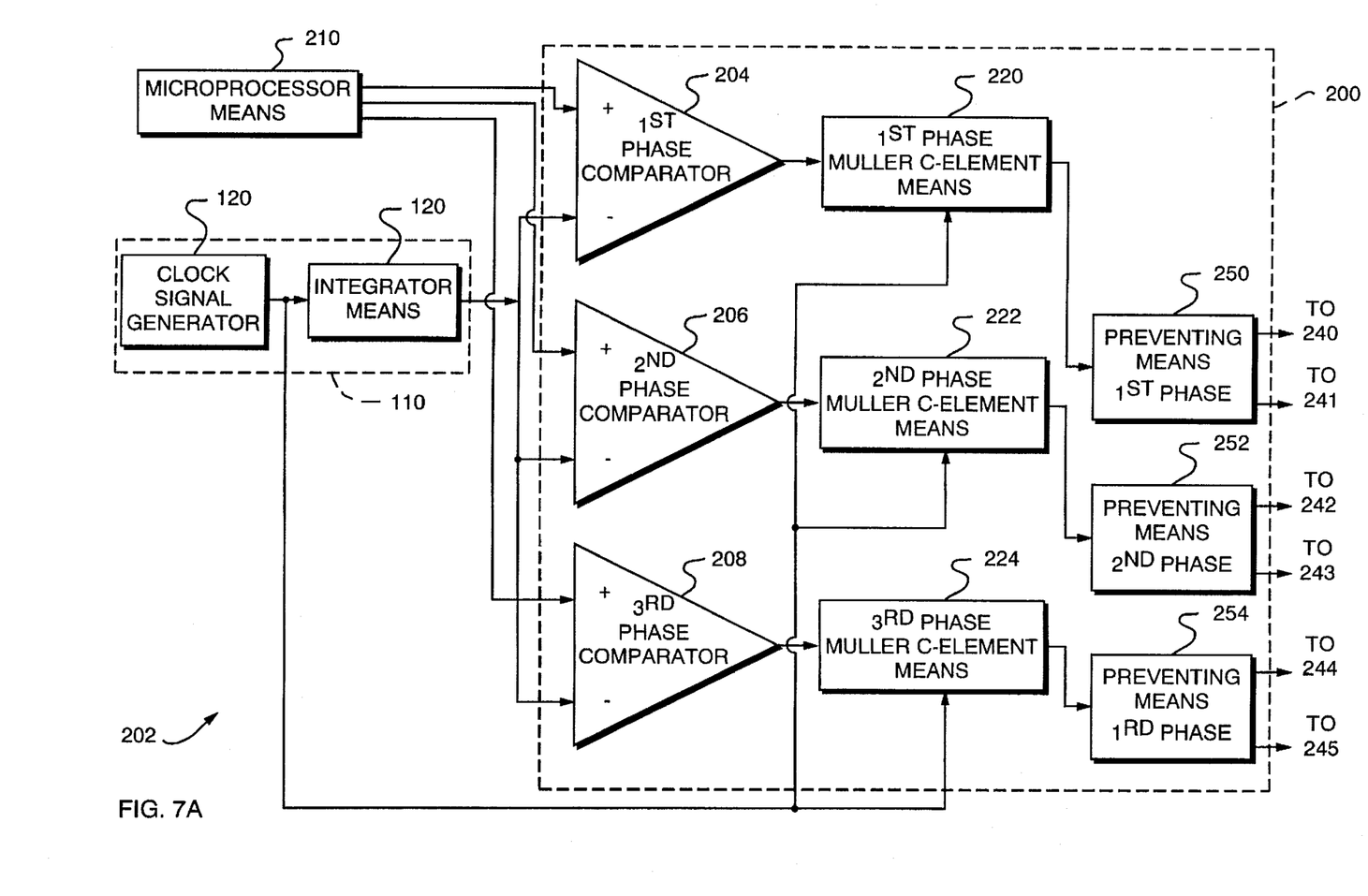
FIG. 7 is a schematic block diagram of another preferred embodiment of the present invention, shown in conjunction with other components of a three-phase motor drive system.
Figure 7B:
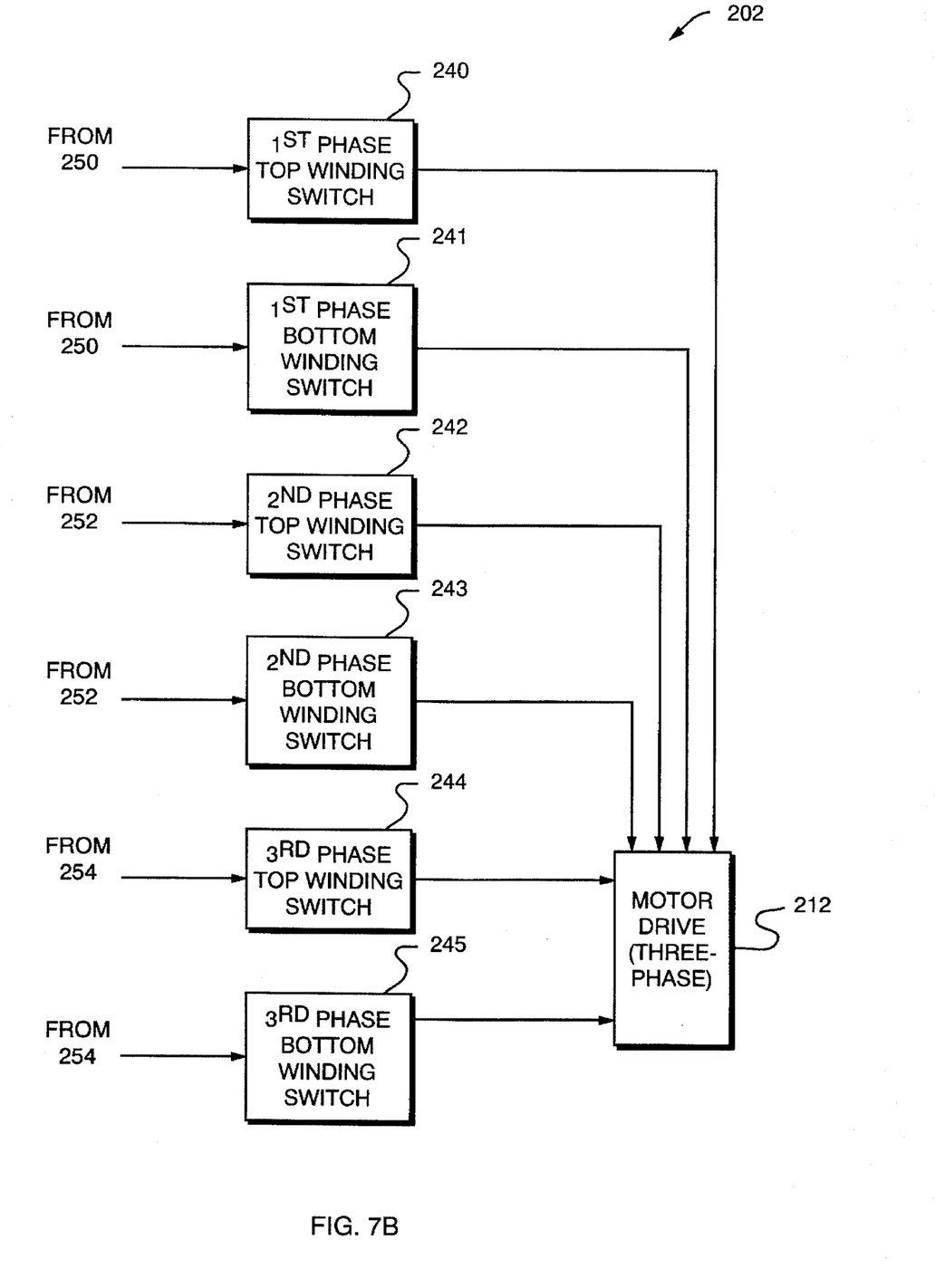

Turning now to FIG. 7, another embodiment 200 of the present invention for use in a three-phase motor drive system 202 will presently be described. Embodiment 200 comprises three comparators 204, 206, 208 for receiving control signals from microprocessor means 210 for activating top and bottom half-bridge switches 240, 246, 242, 243, 244, 245 for each of the three phases of motor 212. It should be appreciated that although not shown in FIG. 7, microprocessor 210 receives inputs related to the actual and/or desired states of the motor drive 212 and processes them in a manner similar to that of the microprocessor of drive system 102. Control signals for each of the phases of motor 212 are compared by comparators 204, 206, 208 with triangular reference signals generated by means 110. Pulse width modulated signals subject to inclusion of multiple noise-related pulses are generated for each phase by the comparators, and transmitted along with clock signals from generator 120 to Muller C-element means 220, 222, 224 for each respective phase of the motor drive 212. C-element means 220, 222, 224 generate final pulse width modulated pulses for each phase, which final pulses are substantially free of noise-related pulses.

Functionally, these final pulses are then transmitted to separate means 250, 252, 254 for each phase of the motor 212 for preventing both the top and bottom switches for each phase from being actuated at the same time, in order to prevent generation of shoot through current by conduction overlap of the top and bottom switches. Preferably, the preventing means 250, 252, 254 each comprise means for cycling activation between the top and bottom switches of the phases so as to prevent the top and bottom switches of any given phase from being actuated at the same time.

Figure 8:
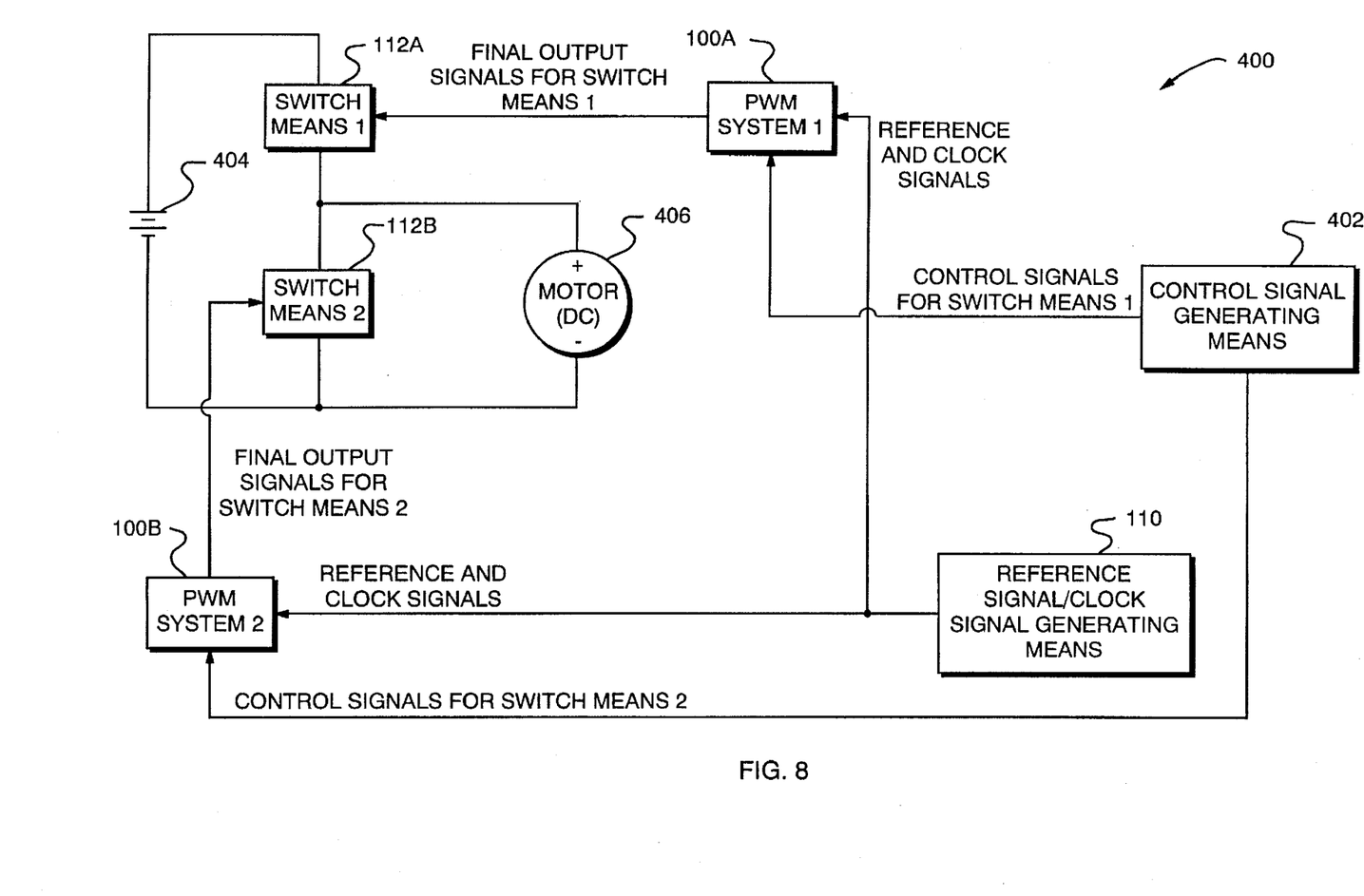
FIG. 8 is a functional block diagram of a variation of the motor drive system shown in FIG. 4, which variation is specifically adapted for use with a DC motor.

FIG. 8 is a functional block diagram of a variation 400 of the drive system 102 shown in FIG. 4, which variation 400 is specifically adapted for use with a conventional DC brush motor 406 whose direction and speed of rotor rotation depend upon the direction and magnitude, respectively, of DC power being supplied to the motor 406. It should be appreciated that although not shown in FIGS. 8–10, preferably, PWM systems 100A, 100B comprise conventional comparator means and Muller C-element means, and the reference and clock signal generator means 110 comprises clock signal generating means and integrator means; all of these components (i.e. the aforesaid components not explicitly shown in FIGS. 8–10) function substantially similar fashion to the aforesaid components described previously.

As shown in FIG. 8, control signal generating means 402 generates two sets of control signals which are supplied to the modulator systems 100A, 100B. As will be discussed more fully below, the control signals supplied to the system 100A are representative of a desired supply of electrical power from conventional DC power source 404 (e.g., a DC battery or voltage source) to the motor means 406 and those supplied to means 100B are representative of a desired change in rotation of the motor 406. Although not shown in FIG. 8, the control signals generated by the generating means 402 (which may be e.g., a conventional microprocessor, memory and control circuitry) may be based upon input signals received by the generator means 402 related to user requested motor operation, battery power condition, and (for reasons that will be seen shortly) present switch means actuation states (i.e., whether the switch means 112A, 112B are closed or open).

Modulator systems 100A and 100B receive as inputs the control signals for the switch means 112A, 112B, respectively, and the reference and clock signals generated by means 110. In response to these input signals, systems 100A, 100B produce final output pulse width modulated signals (i.e., switching signals) for actuating the switch means 112A, 112B, which final signals are substantially free of erroneously generated noise-related signals, due to the advantageous features of the present invention discussed previously in connection with the systems of FIGS. 4-7.

Figure 11:
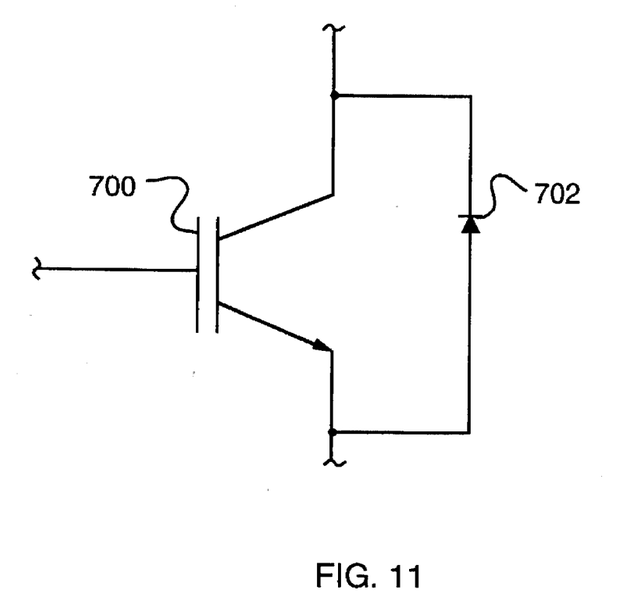
FIG. 11 is a schematic diagram of one preferred construction of an IGBT and a diode connected together in an anti-parallel configuration for use in the switch means of the embodiments of FIGS. 8–10.
Figure 12:
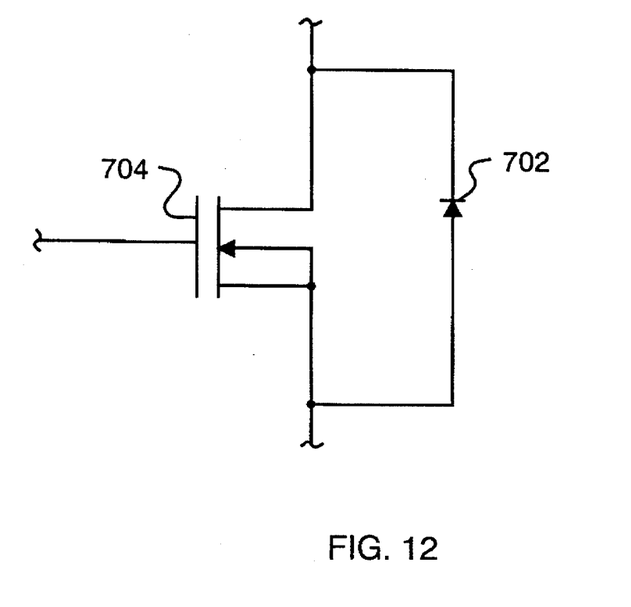
FIG. 12 is a schematic diagram of one preferred construction of a MOSFET and a diode connected together in an anti-parallel configuration for use in the switch means of the embodiments of FIGS. 8–10.

The switching signals generated by the systems 100A, 100B are supplied to the switch means 112A, 112B, respectively, and control actuation states of the switch means 112A, 112B. Preferably, in this system, the switch means 112A, 112B comprise conventional MOSFET or IGBT transistor switches and diodes connected together in antiparallel configurations. One preferred such construction involving an IGBT 700 and a diode 702 is shown in FIG. 11, and another preferred such construction involving a MOSFET 704 and a diode 702 is shown in FIG. 12.

In operation of system 400, control means 402 controls the speed of rotation of the motor 406 in the following manner. When control means 402 determines that the rotation speed of the motor 406 is to be increased, control means 402 generates control signals for increasing the supply of power from power source 404 to the motor 406. These control signals cause the modulator systems 100A, 100B to generate switching signals for closing switch means 112A and for opening switch means 112B. This causes electrical power to flow from source 404 through motor 406, thereby causing speed of rotation of the motor 406 to increase.

If and/or when the motor exceeds the desired speed of rotation, the control means 402 generates control signals for changing the speed of rotation of the motor 406 by causing the modulator systems 100A, 100B to change states (i.e., switch means 112A opens and switch means 112B closes). This stops power from flowing from the source 404 to the motor 406, and also permits the back electromotive force (EMF) that has been generated in the motor 406 to be used to reverse the flow of current being applied to the motor 406. These phenomena rapidly reduce the speed of rotation of the motor 406, and advantageously permit non-mechanical "regenerative braking" of the motor 406.

Figure 9:
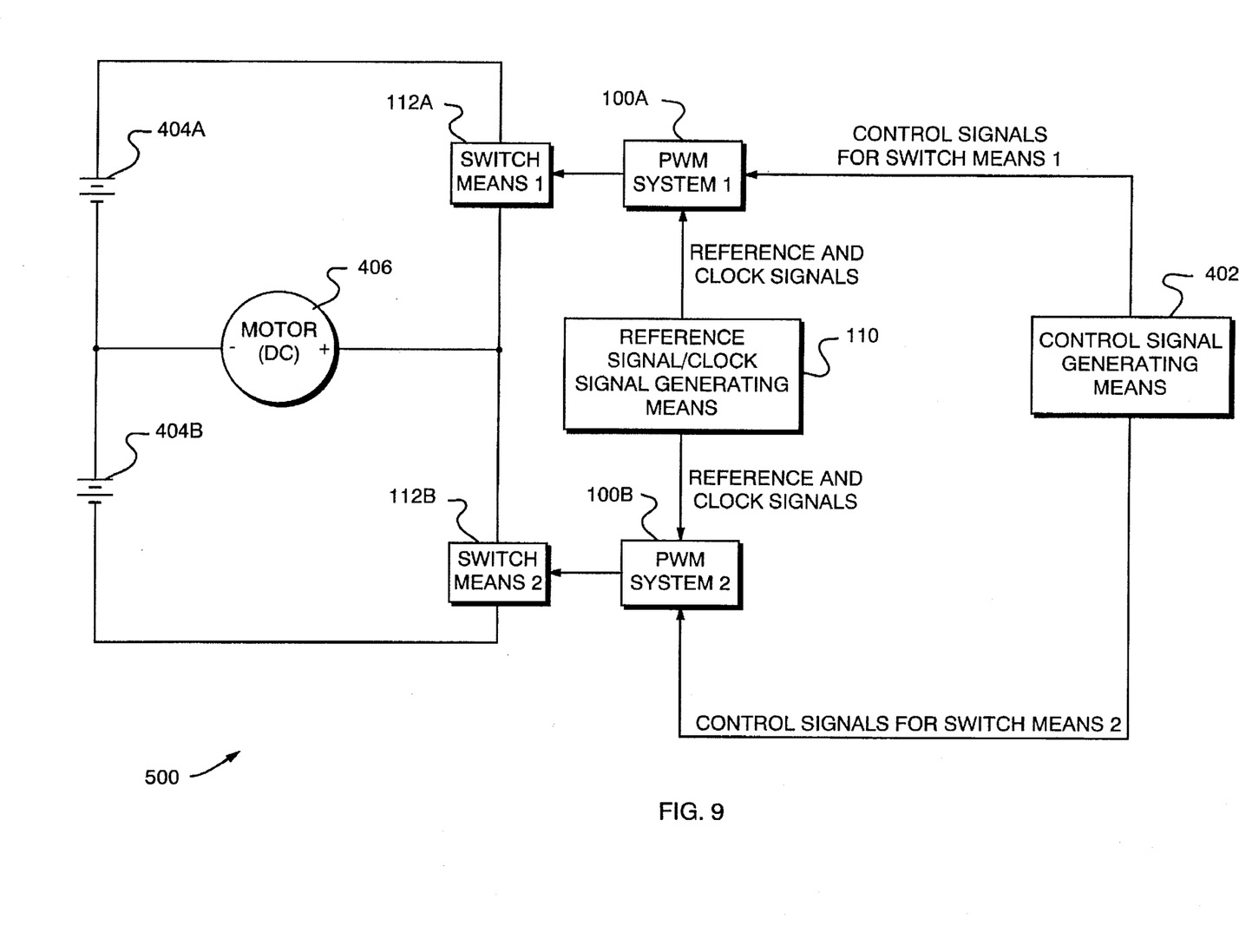
FIG. 9 is a functional block diagram of modification of the system shown in FIG. 8.

A modification 500 of the system 400 is shown in FIG. 9. System 500 operates in a substantially similar manner to the system 400 of FIG. 8. However, for reasons more fully explained below, in system 500, control means 402 is able not only to slow the speed of rotation of motor 406 by controlling switches 112A, 112B, but is also able to reverse the direction of rotation of the motor 406 and to cause regenerative braking in either direction of rotation of the motor, by toggling the actuation states of the switching means 112A, 112B, as explained below.

When switch means 112A is closed and switch means 112B is open, power flows from source 404A through motor 406 via switch 112A. This causes the motor 406 to rotate in a particular direction.

Thereafter, if switch means 112A is caused to open and switch 112B is closed, power flow from source 404A will stop, and instead, power will flow from source 404B in a direction opposite to that when switch 112A was closed and switch 112B was open. This change in direction of power flow through motor 406 acts in concert with the back EMF (previously generated by the motor 406 when the power flow was in the opposite direction) to cause the rotation speed of the motor to slow rapidly and, if sufficient time elapses without a change in actuation states of the switches, to reverse direction of rotation of the motor 406.

Similarly, if switch means 112B is again opened and switch means 112A is closed. Power flow from source 404B to the motor will stop and power flow (in a direction opposite to that previously from source 404B) from source 404A will resume. This will slow rotation of the motor and, if sufficient time elapses without a change in actuation states of the switches, will reverse the direction of rotation of the motor.

Thus, system 500 is able to cause the motor 406 to rotate in either direction and to regeneratively brake motor 406 in either direction of rotation of the motor 406.

Figure 10:
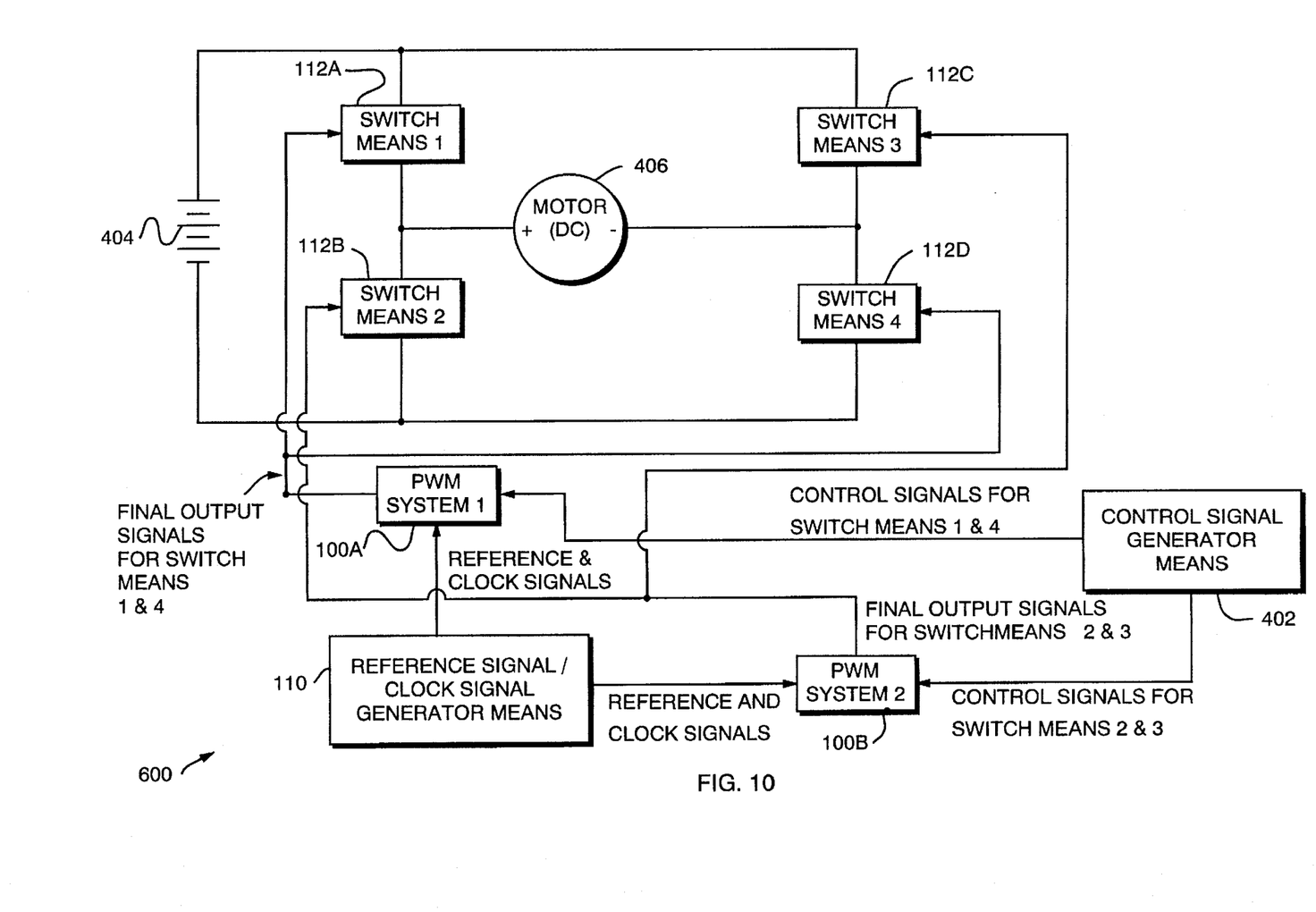
FIG. 10 is a functional block diagram of yet another modification of the system shown in FIG. 8.

FIG. 10 shows a "full-bridge" topological modification 600 of system 500. System 600 essentially operates upon principles discussed previously in connection with system 500, except that in system 600, the final switching signals generated by the systems 100A, 100B actuate pairs of switches, 112A and 112D, and 112B and 112C, respectively. When switches 112A, 112D are closed and switches 112B, 112C are open, power flows from source 404 through switch 112A, motor 406, and switch means 112D. When the actuation states of the switches 112A . . . 112D are reversed, power flows in the opposite direction through motor 406 (i.e., from source 404 through switch 112C, motor 406, and switch 112B).

It will be appreciated that in order to prevent damage to systems 400 and 500, the control means 402 must be programmed to generate control signals adapted to ensure that switches 112A, 112B are never permitted to be both closed at any given time (i.e., so that at least one switch is open at any given time). For the same reasons, the control means 402 in system 600 must be programmed so that switches 112A, 112B, 112C, 112D are never permitted to be all closed at the same time (i.e., so that at least one pair of switches is open at any given time).

Thus, it is evident that there has been provided a pulse width modulator system that fully satisfies both the aims and objectives hereinbefore set forth. Although the present invention has been described in connection with preferred embodiments and methods of use, it will be apparent to those skilled in the art that many variations, modifications, and alternative thereof are possible without departing from the instant invention. For example, although the clock signal generator has been shown as being a separate structural entity, it could be comprised within the microprocessor, if the system 102 were appropriately modified and the microprocessor were programmed to generate appropriate clock signals. Additionally, by modifying the systems 100, 200 of the present invention in ways apparent to those skilled in the art, they may be used to control motor drives of any number of phases.

Furthermore, in order to prevent propagation of any statically invalid or oscillatory comparator output signals into the Muller C-element until such time as resolution to a valid logic level is obtained, Muller C-element may comprise a clocked latch or similar circuit (not shown) at input 171. Other conventional techniques may also be used to help prevent the Muller C-element from entering and/or remaining in a metastable state.

Other modifications are also possible. For example, although the various elements of the systems has been described as being discrete components, they may be comprised within very large scale integrated circuits, programmable logic arrays, and/or similar devices, so as to reduce the space they consume.

Additionally, if system 400 is appropriately modified, the switch means 112B may simply comprise a diode biased to force current flow generated by back EMF through motor 406.

Accordingly, the present invention is intended to embrace all such variations, modifications, and alternatives as may be included within the spirit and scope of the hereinafter appended claims.

What is claimed is:

1. A switch controller, comprising:
   a. means for generating pulse width modulated signals in response to control and reference signals, said modulated signals being subject to inclusion of signals erroneously generated by said generating means as a result of noise in said control and reference signals; and
   b. Muller C-element means for suppressing said erroneously generated signals whereby to generate final output switching signals that are substantially free of said erroneously generated signals.

2. A controller according to claim 1, wherein said reference signal has a triangular waveform that substantially lacks dead time intervals.

3. A controller according to claim 1, wherein said Muller C-element means comprises first, second, and third logical AND means, each of said AND means having an output and two inputs, and a logical OR means having three inputs and an output, said output of said logical OR means being for transmitting said switch controlling signals, said outputs of said AND means being connected to said inputs of said OR means, one of the inputs of said first AND means and one of the inputs of the third AND means means being connected to said output of said OR means, the other of the inputs of the first AND means and one of the inputs of the second AND means being for receiving said modulated signals, and the other of the inputs of the third AND means and the other of the inputs of the second AND means being for receiving timing signals.

4. A controller according to claim 3, and further comprising integrating means for generating said reference signals by integrating said timing signals.

5. A switch controller according to claim 1, wherein said Muller C-element means generates said final output switching signals based upon the pulse width modulated signals generated by said means for generating pulse width modulated signals and also based upon timing signals.

6. A switch controller according to claim 5, further comprising means for generating said reference signals by integrating said timing signals.

7. A system for generating pulse width modulated in response to control and reference signals, said reference signals having a time-varying waveform substantially without dead time, wherein the improvement comprises Muller C-element means for non-hysteretically suppressing noise-related pulses from said pulse width modulated signals.

8. A system according to claim 7, wherein waveform is a triangular waveform.

9. A system according to claim 7, wherein said suppressing means comprises first, second, and third logical AND means, each of said AND means having an output and two inputs, and a logical OR means having three inputs and an output, said output of said OR means being for transmitting pulse width modulated signals with said noise-related pulses removed, said outputs of said AND means being connected to said inputs of said OR means, one of the inputs of said first AND means and one of the inputs of the third AND means being connected to said output of said OR means, the other of the inputs of the first AND means and one of the inputs of the second AND means being for receiving pulse width modulated signals subject to inclusion of said noise-related pulses, the other of the inputs of the third AND means and the other of the inputs of the second AND means being for receiving timing signals.

10. A system according to claim 7, wherein said Muller C-element means is also for generating, based upon timing signals different from said reference and control signals, final output pulse width modulated signals that are substantially devoid of said noise-related pulses.

11. A system according to claim 10, further comprising, means for integrating said timing signals whereby to generate said reference signals.

12. A motor drive control system, comprising:
   a. means for generating a time-varying control signal representative of a desired supply of electrical power to a motor;
   b. means for comparing said control signal to a periodic reference signal and for generating a pulse width modulated signal based upon said comparison;
   c. Muller C-element means for suppressing from said modulated signal a portion of said modulated signal erroneously generated by said generating means as a result of noise in said control and reference signals, whereby to generate a switching signal substantially free of said erroneously generated portion; and
   d. switch means for controlling supply of electrical power to said motor based upon said switching signal.

13. A system according to claim 12, wherein said Muller C-element means generates said switching signal based upon a timing signal and said pulse width modulated signal, said timing signal being different from said control and reference signals.

14. A system according to claim 13, further comprising an integrator for generating said reference signal by integrating said timing signal.

15. A system according to claim 12, wherein said control signal generating means comprises a microprocessor.

16. A system according to claim 12, wherein said motor is a DC motor.

17. A system according to claim 12, wherein said motor is an AC motor.

18. A system according to claim 12, wherein said Muller C-element suppressing means comprises first, second, and third logical AND means, each of said AND means having an output and two inputs, and a logical OR means having three inputs and an output, said output of said OR means being for transmitting said switching signal, said outputs of said AND means being connected to said inputs of said OR means, one of the inputs of said first AND means and one of the inputs of the third AND means being connected to said output of said OR means, the other of the inputs of the first AND means and one of the inputs of the second AND means being for receiving said modulated signal, the other of the inputs of the third AND means and the other of the inputs of the second AND means being for receiving a timing signal.

19. A system for controlling supply of electrical power to a motor having at least one phase, comprising:
   a. means for generating a plurality of control signals respectively representative of desired supply of electrical power for each phase of said motor;
   b. means for generating pulse width modulated signals based upon comparison of each of said control signals to respective reference signals;
   c. Muller C-means for suppressing from said modulated signals signals erroneously generated by said generating means as a result of noise in said control and reference signals, whereby to generate switching signals for each said phase of said motor substantially free of said erroneously generated signals; and
   d. switch means for controlling supply of electrical power of each said phase to said motor based upon said switching signals.

20. A system according to claim 19, wherein said Muller C-means generates said switching signals based upon timing signals and said pulse width modulated signals, said timing signals being different from said control and reference signals.

21. A system according to claim 20, wherein said timing signals have a periodic square-shaped waveform, and said reference signals have a periodic triangular waveform.

22. A system according to claim 19, wherein said motor is a three-phase motor.

23. A system according to claim 19, wherein said control signal generating means comprises a microprocessor for generating said control signal based upon input signals related to present and desired operation of said motor.

24. A system according to claim 23, wherein said input signals include signals related to electrical current in said said motor.

25. A system according to claim 23, wherein said input signals include signals related to rotor position of said motor.

26. A system according to claim 23, wherein said input signals include signals related to user requested motor operation.

27. A system according to claim 19, wherein said switch means comprises a plurality of switching means for each said phase of said motor.

28. A system according to claim 27, wherein said switching means comprises means for preventing conduction overlap of top and bottom switching means for said motor.

29. A system according to claim 19, wherein said control signal generating means is also for generating said control signals based upon input signals related to electrical current in said motor.

30. A system according to claim 19, wherein said control signal generating means is also for generating said control signals based upon input signals related to rotor position of said motor.

31. A system according to claim 19, wherein said control signal generating means is also for generating said control signals based upon input signals related to user requested motor operation.

32. A system according to claim 19, wherein said Muller C-element suppressing means comprises first, second, and third logical AND means, each of said AND means having an output and two inputs, and a logical OR means having three inputs and an output, said output of said OR means being for transmitting said switching signals, said outputs of said AND means being connected to said inputs of said OR means, one of the inputs of said first AND means and one of the inputs of the third AND means being connected to said output of said OR means, the other of the inputs of the first AND means and one of the inputs of the second AND means being for receiving pulse width modulated signals, the other of the inputs of the third AND means and the other of the inputs of the second AND means being for receiving timing signals.

33. A system for controlling a motor, and comprising:

a. means for generating at least two control signals, one of said two control signals being representative of desired supply of electrical power to said motor and the other of said two signals being representative of desired change in rotation of said motor;

b. means for generating pulse width modulated signals based upon comparison of each of said control signals to respective reference signals;

c. Muller C-element means for suppressing from said modulated signals noise-related signals erroneously generated as a result of noise in said control and reference signals, whereby to generate at least two switching signals that are substantially free of said erroneously generated noise-related signals; and d. at least two switch means, one of said switch means being for controllably supplying said electrical power to said motor based upon one of said switching signals, the other of said switch means being for controllably permitting at least a portion of said electrical power to flow out of said motor based upon the other of said switching signals.

34. A system according to claim 33, wherein at least one of said two switches comprises a diode.

35. A system according to claim 33, wherein said other switch means is also for supplying additional electrical power to said motor, said additional power having a direction of flow that is opposite to that of the electrical power supplied by said one switch means.

36. A system according to claim 33, wherein said change in rotation comprises slowing rotation of said motor.

37. A system according to claim 33, wherein said change in rotation comprises reversing direction of rotation of said motor.

38. A system according to claim 33, wherein said at least two switch means comprises two pairs of switch means, one pair of said switch means for being controlled by said one of said switching signals and the other pair of said switch means for being controlled by the other of said switching signals.

39. A system according to claim 38, wherein said system is adapted to permit only one of said two pairs of switch means to be closed at a given time.

40. A system according to claim 33, wherein said switching signals are adapted to permit only one of said two switch means to be closed at a given time.

41. A system according to claim 33, wherein said Muller C-element means comprises at least one Muller C-element logic circuit comprising first, second, and third logical AND means, each of said AND means having an output and two inputs, and a logical OR means having three inputs and an output, said output of said OR means being for transmitting switching signals, said outputs of said AND means being connected to said inputs of said OR means, one of the inputs of said first AND means and one of the inputs of the third AND means being connected to said output of said OR means, the other of the inputs of the first AND means and one of the inputs of the second AND means being for receiving modulated signals, the other of the inputs of the third AND means and the other of the inputs of the second AND means being for receiving timing signals.

* * * * *

UNITED STATES PATENT AND TRADEMARK OFFICE
CERTIFICATE OF CORRECTION

PATENT NO. : 5,637,971
DATED : June 10, 1997
INVENTOR(S) : Gill A. Pratt

It is certified that error appears in the above-identified patent and that said Letters Patent is hereby corrected as shown below:

Claim 3, Col. 11, line 24, "means means" should be --means--.

Signed and Sealed this

Eighteenth Day of August, 1998

Attest:

BRUCE LEHMAN

*Attesting Officer*      *Commissioner of Patents and Trademarks*